March 7, 1967 H. FAR 3,307,522
DEVICE FOR SUPPORTING FOUNT RECEPTACLES AND FOR CONTROLLING
THE SUPPLY OF LIQUID TO SUCH RECEPTACLES
Filed Jan. 10, 1966
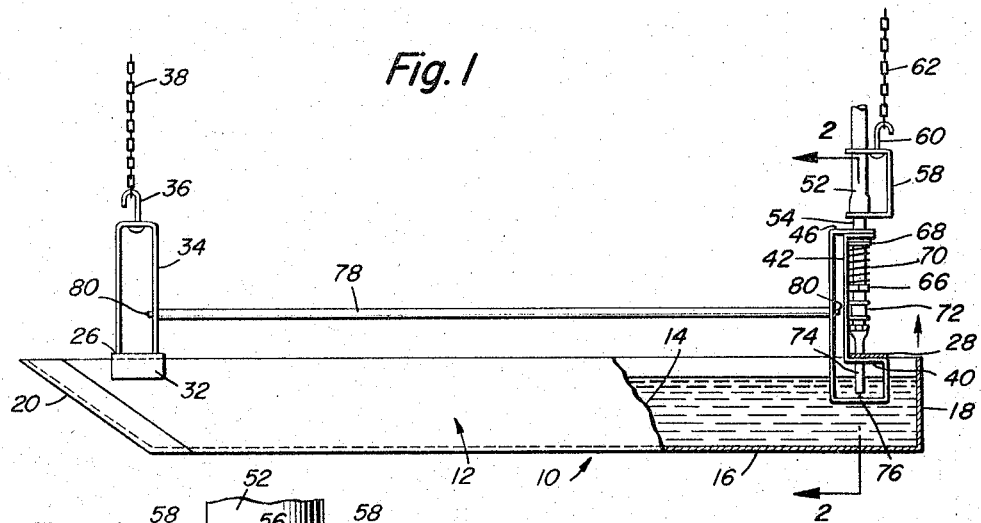
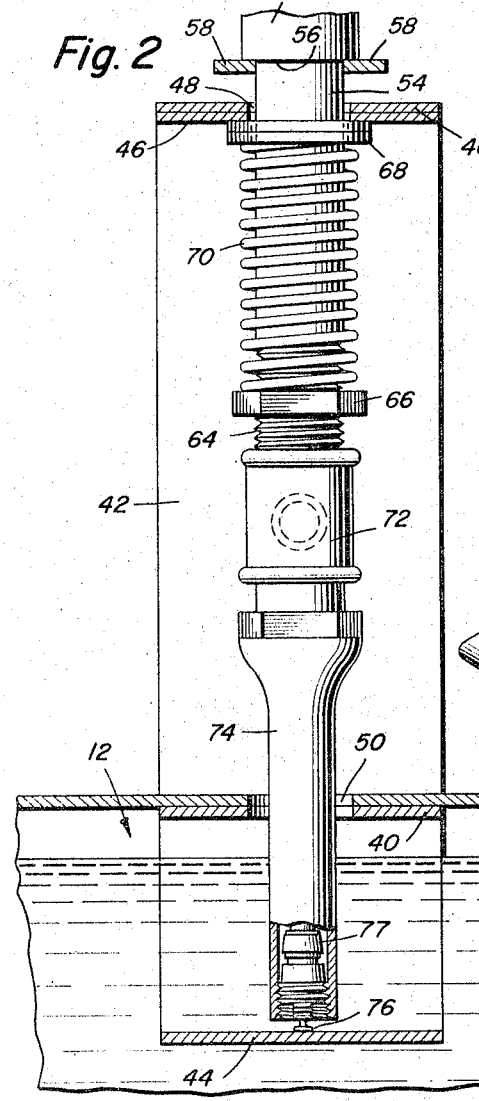
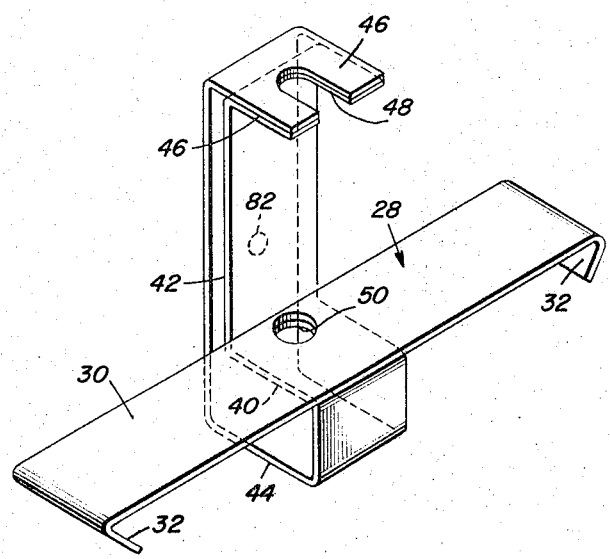
INVENTOR
Hilario Far
BY *Gustave Miller*
ATTORNEY

3,307,522
DEVICE FOR SUPPORTING FOUNT RECEPTACLES AND FOR CONTROLLING THE SUPPLY OF LIQUID TO SUCH RECEPTACLES
Hilario Far, East Brookfield, Mass. 01506
Filed Jan. 10, 1966, Ser. No. 519,567
3 Claims. (Cl. 119—81)

This invention relates to a device for supporting a fount receptacle and for controlling the supply of liquid to such a receptacle, and is in the nature of an automatically replenished drinking fountain for poultry and domestic animals.

It is the object of this invention to provide a simplified construction that is cheaper and easier to construct and assemble than the present devices.

A further object of this invention is to provide a drinking device easy to disassemble for cleaning and replacement purposes, and at most, needing only a single wrench in the assembly process.

A further object of this invention is to provide a watering trough for poultry and domestic animals which is simple in construction and operation, which can be readily disassembled for stowage or cleaning, and which can be readily reassembled for operation. It relates particularly to poultry drinking founts where control of the water level is provided by response of a water inlet valve to varying weight of the trough and the liquid therein, and of course may be used with any liquid, not water alone. It is basically an improvement over the patents of the prior art, such as those to Goff, 2,714,389 and 2,714,390 as well as to Kubista, No. 2,501,727; Landgraf, No. 2,716,423 and Williams, No. 2,827,015.

In brief, this invention consists of a watering trough on which is mounted a pair of spaced apart readily detachable and attachable brackets, which carry the weight of the trough and of the liquid therein. The brackets slide readily to holding position over the troughs, one adjacent each end. One bracket is directly suspended by a chain from an overhead support, the other is indirectly suspended by a similar chain similarly supported. The indirect suspension means of the second bracket includes a water supply pipe and tube which are connected to the chain, a valved spout, generally similar to a pneumatic tire valve, at the bottom end of the pipe and tube, a compressible coil spring adjustably supported about said pipe and tube, and a vertical arm having a bottom finger extending under the downwardly projecting stem of the valve in the spout, an intermediate finger extending under the trough supporting bracket, and a bifurcated upper finger extending around said pipe and tube and resting on said compression spring. The bias of the compression spring is adjusted by a nut, which may be knurled so that when the proper water level is reached, the valve stem is just free of the lower finger, thus closing the inlet water valve and when the water level is less than the desired amount, the spring lifts the vertical arm and thus its lower finger into abutting contact with the valve stem, moving it to water discharge position and holding the valve open until the weight of the accumulating water compresses the coil spring to lower the arm and lower bracket finger to permit the valve to close. In addition, an anti-roosting rod is rotatably supported over the trough.

With the above and related objects in view, this invention consists in the details of construction and combination of parts, as well be more fully understood from the following description, when read in conjunction with the accompanying drawing, in which:

FIG. 1 is an elevational view, partly in section, of the drinking fount in operative position.

FIG. 2 is a sectional view on line 2—2 of FIG. 1.

FIG. 3 is a perspective view of one supporting bracket and its associated vertical arm and fingers.

There is shown at 10 the assembled fount receptacle or drinking device of this invention. This device 10 includes an elongated watering trough 12 having elongated opposite side walls 14 which flare upwardly and outwardly from each other from the trough bottom floor 16, one end wall 18 being vertical and the other end wall 20 being slanting, as shown. The rigidity of the side walls 14 is reinforced by having a turned down flange 22. This trough 12 is designed to hold water 24, or any other liquid.

Slidably secured over the edges of the outwardly flared reinforced elongated side walls 14 are a pair of brackets 26 and 28, each consisting of an elongated plate 30 and inwardly converged flanged ends 32 complementary to the angle of the side walls 14, to thus removably yet securely hold on the trough 12. Secured to the bracket 26 in any suitable manner, at the center of its plate 30, is an inverted U-shaped member 34 having its U-legs attached to the bracket 26 and having a J-hook 36 secured to its bight and providing a means for hooking onto a link of a chain 38, whose other end is supported from any suitable support thereabove.

The other bracket 28 rests or is supported on an intermediate finger 40 on a vertically extending arm 42, from which also extends, in spaced relation below the finger 40, a lower finger 44. Also extending from the vertical arm 42 is an upper bifurcated finger 46 having a space between its bifurcations at 48. Vertically aligned below the space 48 there is an aperture 50 extending through the plate 30 of bracket 28 and through the intermediate finger 40 for use as hereinafter set forth.

A water supply tube 52, connected to any suitable source of water, has a rigid pipe 54 inserted into its end, providing a shoulder 56, and a U-bracket, 58, on its side, has its legs apertured, with one leg aperture fitting about the tube 52, and the other leg aperture fitting about the pipe 54 and under and supporting the shoulder 56. A J-hook 60 is hooked on a chain 62 supported in the same manner as chain 38. The lower end of pipe 54 is threaded at 64 for adjustably receiving a nut 66 thereon. Obviously, the nut may be knurled for ready finger manipulation, if desired. Adjustably biased between the nut 66 and washers 68 located on pipe 54 is an expandable coil compression spring 70. The assembled washers 68 are inserted under the bifurcated finger 46, with the pipe 54 extending down through the space 48 in the finger 46, and obviously may be readily assembled in this manner. As thus far described, the chain 62 through bracket 58, shoulder 56, vertical arm 42 and intermediate finger 40 obviously supports bracket 28 and thus this end of trough 12 just as the chain 38 supports the other end of the trough 12.

Secured to the threads 64 of pipe 54 by a coupling 72 is a liquid discharge spout 74, from the bottom end of which extends a valve stem 76, which valve stem 76, when pressed upwardly, will open the valve within the spout 74, and when relieved of pressure, will close the valve within the spout 74. This valve stem 76, concealed valve 77 and spout 74, are of conventional construction, the same as in a conventional pneumatic tire valve, sometimes commercially known as a "Schraeder" valve.

The spout 74 is of a length to place the valve stem 76 in abutting open position on the lower finger 44 when the trough is empty of water. When enough water has accumulated in trough 12 through spout 74, with the nut 66 properly adjusted, to put the right amount of bias on spring 70, spring 70 will start to compress, letting the trough, filled with water to the proper level, move down and thus move lower finger down away from valve stem 76, permitting the valve 77 to move to closed position and cutting off the water flow. Whenever the combined weight of the water and the trough assembly becomes less by having some water consumed or used up, the spring 70 lifts the trough 12 and the lower finger 44 into valve opening position, in abutting relation with the valve stem 76 of valve 77, thus automatically maintaining the water level at the desired amount.

Obviously, this device 10 may be used to water any kind of domestic animal or poultry. However, when used for poultry, it is desirable to provide an anti-roosting rod 78, which is rotatably journaled by having reduced pins 80 at its ends extending through appropriate bearing apertures 82 in the upright arm 42 at one end and in one leg of inverted bracket 34 at the other end.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A device for supporting a fount receptacle and for automatically controlling the supply of liquid to such receptacle having in combination, a vertical liquid supply pipe, a liquid supply tube having its discharge end removably secured to the top end of said pipe and providing a shoulder thereabout, said fount receptacle being an elongated trough having upwardly, outwardly flaring side walls, a pair of spaced brackets each having a pair of inwardly, downwardly converging end flanges complementary to the outward flare of said trough side walls, said brackets and flanges being removably slidable over said trough to supporting positions adjacent opposite ends thereof, a chain engaging member secured to one of said brackets for attachment to a depending chain and a second chain engaging member engaging said shoulder for attachment to a second depending chain thereby providing height adjustment while maintaining a proper level, a vertical supporting arm having an intermediate horizontal finger extending in bracket supporting position under the second of said brackets, a lower finger spaced below said intermediate finger, and a bifurcated finger spaced above said intermediate finger, said supply pipe extending down through said bifurcated finger and terminating in a threaded lower end, an expansion coil spring about said extending supply pipe below said bifurcated finger, a nut on said threaded pipe end adjustably biasing said spring up against said bifurcated finger, a liquid discharge spout coupled to said threaded pipe end extending through aligned apertures in said second bracket and said intermediate finger to adjacent said lower finger, a valve stem extending downwardly beyond the spout end from a valve in said spout biased downwardly to closed position, said nut being adjusted to bias said spring to lift said trough and said lower finger into valve stem abutting valve open position until a predetermined weight of liquid accumulates in said trough and overcomes such bias to lower said trough and said lower finger to valve stem disengaging position valve closed position.

2. The device of claim 1, said first mentioned chain engaging member comprising an inverted U-member having its legs secured to said first mentioned bracket and a chain engaging hook secured to the bight of said inverted U-shaped member.

3. The device of claim 2, said second mentioned chain engaging member comprising a U-member on its side having apertured legs, said supply tube extending through the aperture of the upper leg, said supply pipe extending through the aperture of the lower leg with said shoulder resting on said lower leg about its aperture, and a chain engaging hook secured to said upper leg.

References Cited by the Examiner
UNITED STATES PATENTS 2,714,390  8/1955  Goff _____ 137—408
3,122,131  2/1964  Warren _____ 119—72

SAMUEL KOREN, Primary Examiner.

HUGH R. CHAMBLEE, Examiner.